Nov. 10, 1936.  E. W. DAVIS  2,060,180

PNEUMATIC MOTOR FOR LUBRICANT PUMPS

Filed May 16, 1932   2 Sheets-Sheet 1

Inventor
Ernest W. Davis
By
Williams Bradbury
McCaleb + Hinkle.
Attys.

Nov. 10, 1936.  E. W. DAVIS  2,060,180
PNEUMATIC MOTOR FOR LUBRICANT PUMPS
Filed May 16, 1932  2 Sheets-Sheet 2
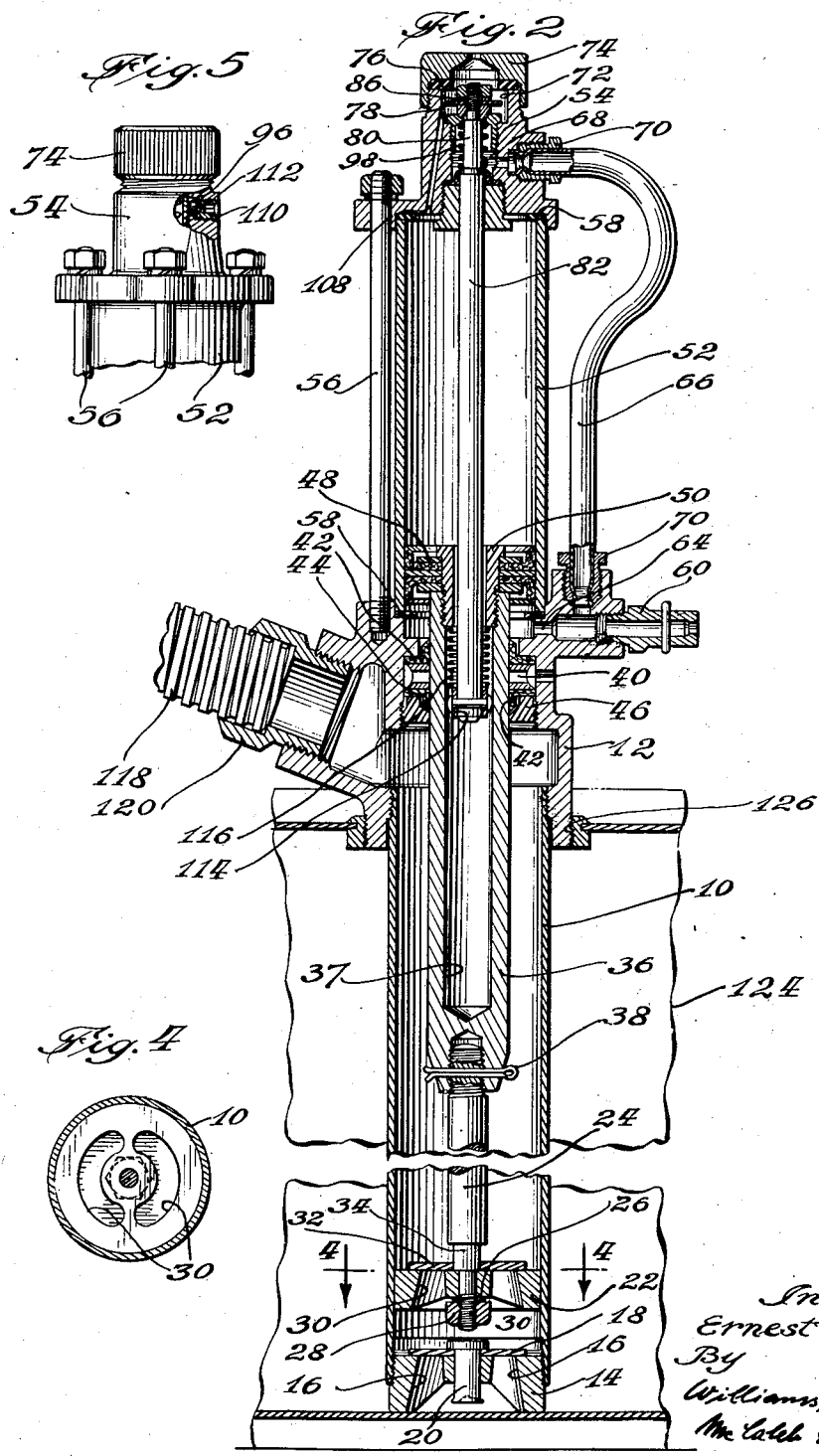

Patented Nov. 10, 1936

2,060,180

UNITED STATES PATENT OFFICE 2,060,180

PNEUMATIC MOTOR FOR LUBRICANT PUMPS

Ernest W. Davis, Oak Park, Ill., assignor, by mesne assignments, to Stewart-Warner Corporation, Chicago, Ill., a corporation of Virginia Application May 16, 1932, Serial No. 611,495

7 Claims. (Cl. 121—164)

My invention relates generally to lubricating apparatus and more particularly to lubricant pumps and pneumatic motor means for operating the same.

It is an object of my invention to provide an improved pneumatic motor for operating a reciprocating pump which is of simplified construction and which may be economically manufactured.

It is a further object of my invention to provide an improved lubricant pump of the type usable to withdraw grease from barrels or other containers.

It is a further object of my invention to provide an improved valve operating mechanism for reciprocating pneumatic motors.

Other objects will appear from the following description, reference being had to the accompanying drawings, in which Figure 1 is an elevation of the pump of my invention, illustrating its use in emptying a barrel;

Figure 2 is a central vertical sectional view of the pump;

Figure 4 is a transverse sectional view taken on the line 4—4 of Fig. 2; and

Figure 5 is a fragmentary view of the valve housing.

Figure 1:
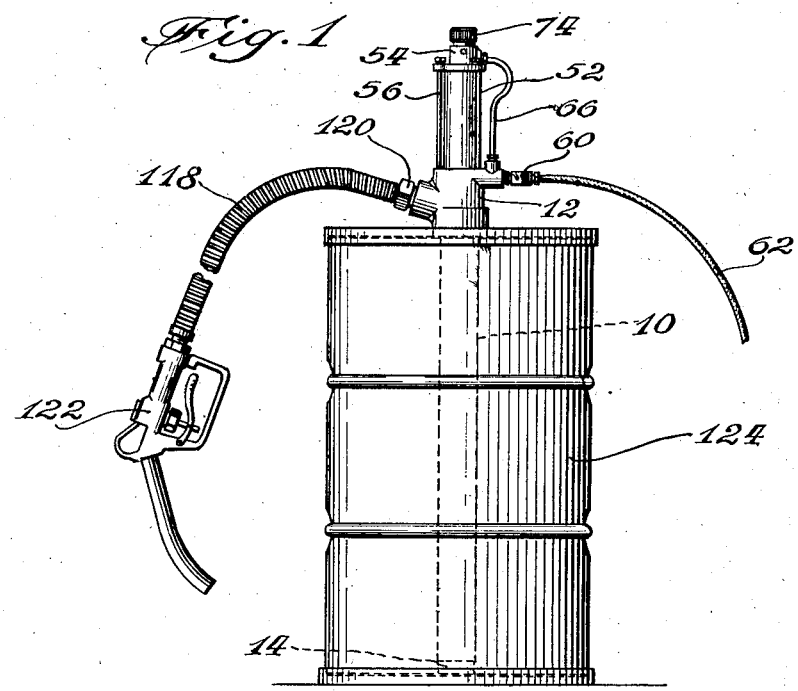

The invention is illustrated as embodied in a pump used for discharging the contents of a barrel or other container, although it may be embodied in any desired type of lubricant pump. The pump comprises a tubular cylinder 10, the upper end of which is threaded in a casting 12 forming the upper head of the pump cylinder. A foot valve seat 14 is threaded in the lower end of the cylinder 10 and has crescent shaped inlet ports 16 which are normally closed by a thin sheet metal valve 18. The valve 18 is held adjacent its seat by a pin 20 which is guided for limited vertical reciprocatory movement in the valve seat 14.

A piston 22 is secured to the lower end of a piston rod 24, being held against a shoulder 26 thereof by a nut 28. The piston 22 has inlet ports 30 which are shaped similar to the inlet ports 16. A valve 32 normally covers the ports 30. This valve is guided on the reduced end portion 34 of the piston rod 24. The piston rod 24 is threaded in the lower end of a hollow piston stem 36, being secured against accidental unscrewing therefrom by a cotter pin 38. The piston stem 36 is guided by a washer 40, a pair of flexible leather gaskets 42, 44 being provided to form a packing between the washer and the stem. The leather gaskets and the washer 40 are held in place by a bushing 46 threaded in the head 12. The washer 40 is provided with one or more diametral holes 41 and an annular groove 43, which when the washer is in position communicate with an aperture 45. Any lubricant leaking past the gasket 44 will thus be vented to the atmosphere and not seep into the air cylinder to interfere with the operation of the air motor, and similarly any air leaking past the gasket 42 will be vented to the atmosphere and not leak into the lubricant chamber to mix with the lubricant being pumped.

A double cup leather piston 48 is secured to the upper end of the stem 36 by means of a tubular bushing 50 and is operable in the air cylinder formed by a tube 52. This tube is clamped between the head 12 and a valve body 54 by suitable tie rods 56, gaskets 58 forming an air-tight seal between the ends of the tube and the head 12 and the valve body 54 respectively. A nipple 60 is provided for making a detachable connection with a compressed air supply hose 62. The compressed air supply hose is at all times in communication with the lower end of the cylinder 52 through a port 64. A pipe 66 conducts compressed air from said nipple to the central threaded bore 68 of the valve body, the pipe being secured to both the valve body and to the head 12 by any suitable air-tight coupling means such as the compression couplings 70 shown in Figure 2.

The valve body 54 has a counterbore 72, the upper end of which is closed by an apertured cap 74 which serves to hold a deformable valve seat 76 against the upper end of the valve body 54. A disc valve 78 is secured to the upper reduced diameter end portion 80 of a valve stem 82, being clamped thereon between a poppet valve 84 and a lock washer 86 which is held in place by a nut 88 threaded upon the extremity of the upper end portion 80 of the valve stem. Said portion of the valve stem has a plurality of flutes 90, the shoulders formed by the spaces between the flutes forming a shoulder against which the valve 84 is clamped. A seat 92 for the valve 84 is provided in a valve seat bushing 96 threaded in the bore 68, the latter serving also as an abutment for the upper end of a compression coil spring 98, the lower end of which rests upon a shoulder 100 on the valve stem 82. A hat washer gasket 102 prevents leakage of air around the valve stem 80, being clamped against a shoulder 104 formed in the valve body by a packing nut 106. A passageway 108 connects the counterbore 72 with the upper end of the cylinder formed by the tube 52. As shown in Figure 5, the valve seat bushing 96 is held in place by a hollow head set screw 110 which presses a soft metal disc 112 against the threads of the bushing.

A collar 114 is riveted to the lower end of the valve stem 82 and forms a seat for the lower end of a compression coil spring 116, the upper end of which abuts against the lower end of the sleeve 50.

A lubricant discharge conduit 118 is secured to the head 12 by means of a threaded bushing 120. A valved discharge nozzle 122 may be provided at the extremity of the conduit 118, if desired, to control the flow therethrough.

In operation the tubular pump cylinder 10 is inserted in a barrel 124 or other suitable container, the lubricant contents of which are to be withdrawn, such barrel being customarily provided with a threaded opening 126. The pump cylinder 10 is of course preferably made sufficiently long so that the foot valve seat 14 will rest upon the bottom of the drum. The air hose 62 is then connected to the nipple 60 and the valve nozzle 122 opened to permit discharge of lubricant. Upon connection to the source of air under pressure with the parts in the position shown in Fig. 2, the piston 48, together with its stem 36 and rod 24 and lubricant piston 22, will be forced upwardly due to the pressure of the air on the lower surface of the double cup leather piston 48. The upper end of the cylinder 52 is at atmospheric pressure due to the communication established by the passageway 108. During the upward stroke of the piston 22 the valve 32 will of course be closed by gravity and by the differential pressures on the opposite sides thereof, and any lubricant above the piston will be forced outwardly through the discharge conduit 118. During this upward movement of the piston 22 the valve 18 will be raised and a new charge of lubricant sucked in from the barrel through the inlet ports 16, past the valve 18.

During this upward movement of the piston 48 and its associated parts, the valve stem 82 will remain stationary due to the fact that the effective area of the stem 82 is slightly greater than the area of the valve 84 exposed to air pressure, and because this action of the air pressure is reinforced by the compression spring 98. When, however, the piston 48 reaches the upper limit of its stroke, the lower end of the valve stem 82 will be engaged by the bottom of the bore 37 formed in the stem 36, and the valve stem 82 and all parts connected therewith moved upwardly. This upward movement of the valve stem causes unseating of the valve 84 and substantially simultaneous seating of the valve 78 against its rubber composition seat 76.

Figure 3:
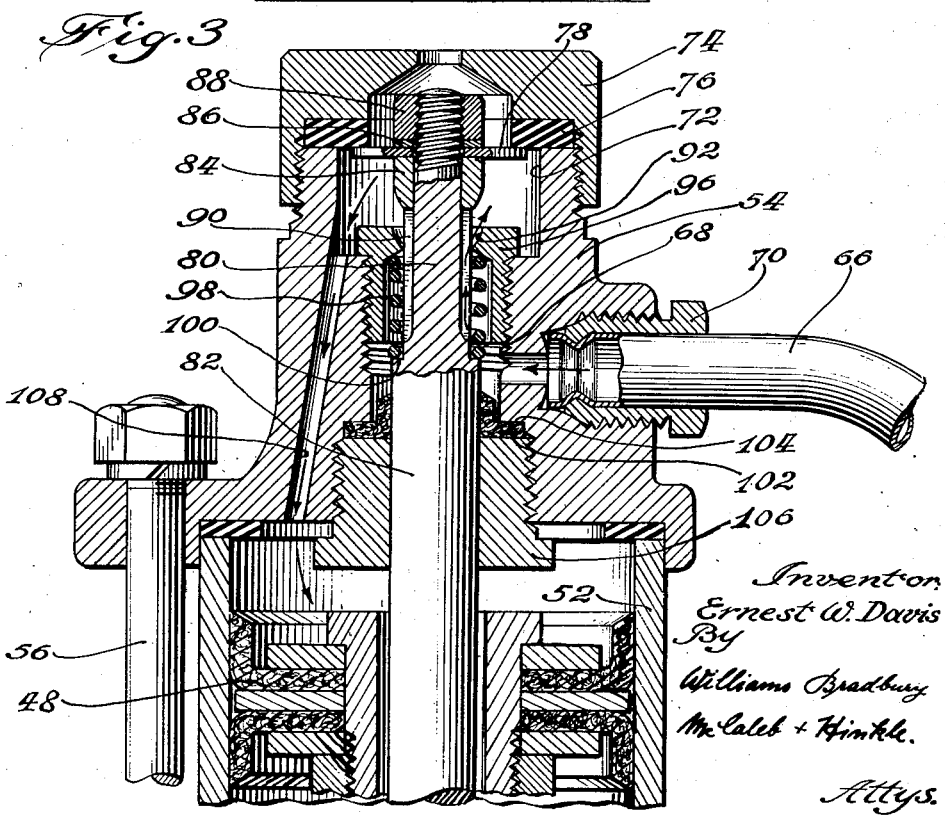
Figure 3 is an enlarged central vertical sectional view of the air valve mechanism.

As soon as the valve 84 is moved a minute distance from its seat 92, the lower surface of the valve 84 and the lower surface of the disc valve 78 will be subjected to the pressure of the compressed air, and the valve stem 82 will therefore be moved very rapidly upwardly until, as stated, the disc valve 78 firmly seats against its seat 76. The parts will thus assume the position in which they are shown in Figure 3. When in this position the compressed air will flow from the pipe 66 into the threaded bore 68 through the flutes 90 in the upper portion of the valve stem and into the counterbore 72, from whence the air will flow through the passageway 108 to the upper end of the cylinder 52. The effective area of the upper surface of the piston 48 is substantially that of the cross sectional area of the tubular cylinder 52, while the effective area of the lower surface is greatly reduced because of the piston stem 36. The total pressure upon the upper surface of the piston will therefore be much greater than that exerted upon the lower surface thereof even though the unit pressure is substantially the same. This difference in total pressure upon the opposite sides of the piston 48 will cause downward movement of the latter. During this downward movement, the foot valve 18 will of course remain closed, and the lubricant contained between this valve and the piston 22 will be forced through the ports 30 into the space above the piston 22. A certain proportion of the lubricant within the cylinder 10 will be ejected because of the displacement of the stem 36.

As the piston 48 reaches the lower limit of its stroke, its sleeve 50 will engage the upper end of the spring 116 and compress the latter until the force exerted downwardly upon the valve stem 82 by the spring is sufficient to overcome the force of the compressed air, which tends to maintain the valve stem 82 in its uppermost position. When this occurs, the valve stem 82 will have a quick snap action since as soon as the seal between the disc valve 78 and its seat is broken, the pressure upon the opposite sides of the disc valve will be approximately equalized, and as a consequence the effective force of the compressed air tending to hold the valve stem 82 in its upper position, will be greatly and suddenly reduced. When the valve stem 82 is thus snapped to its lower position, the upper end of the cylinder 52 will again be in communication with the atmosphere and the above described cycle of operations repeated. The lubricant pump will thus continue operation until the supply of compressed air is shut off or until the valve in the nozzle 122 is closed and sufficient back pressure built up in the conduit to "stall" the compressed air pump.

While the invention has been disclosed as applied to a low pressure lubricant dispenser, it is contemplated that it be employed for high pressure lubricant pumps by suitable modification of the lubricant cylinder and piston, and by the provision of suitable means for priming the lubricant cylinder where such priming is necessary.

While I have illustrated and described a preferred embodiment of my invention, many modifications may be made without departing from the spirit of the invention, and I do not wish to be limited to the precise details set forth but desire to avail myself of all changes within the scope of the appended claims.

I claim:

1. In a lubricant pumping mechanism having a lubricant cylinder and a piston reciprocable therein; an air motor comprising, an air piston operatively associated with said lubricant piston, a cylinder for said air piston, means for continuously supplying air under pressure to one end of said cylinder, an quick snap-over poppet valve mechanism operable by said piston alternately to connect the other end of said air cylinder to the atmosphere and to said source of air under pressure.

2. A fluid motor for the operation of lubricant compressors comprising a cylinder, a piston reciprocable therein, said piston having a stem of appreciable cross sectional area projecting from one end of said cylinder, means for continuously admitting air under pressure to the end of said cylinder through which said stem projects, a valve stem, a resilient lost motion connection between said piston and said valve stem, a pair of poppet type valves secured to said stem, seats for said valves respectively, and passageways connecting the other end of said cylinder with the atmosphere and with said source of air under pressure respectively, said passageways being arranged to be closed alternately by said valves.

3. In a lubricant pumping mechanism having a lubricant cylinder with a reciprocable plunger; a pressure fluid motor providing the energy for reciprocating said plunger to effect the discharge of lubricant from said cylinder, said motor being operative to start from any position of rest and comprising an air cylinder, a piston, a piston rod secured thereto and connected to said plunger, a source of pressure fluid, a continuously open pneumatic connection between said source and one end of said air cylinder, and a snapover valve mechanism operable by said piston alternately to connect the other end of said air cylinder to the atmosphere and to said source of pressure fluid.

4. In a fluid motor for operating a lubricant pumping mechanism the combination of a cylinder and a piston, having a piston rod, with a cylinder head, a pneumatic continuously open connection between the cylinder on the piston rod side of the piston and a source of pressure fluid, and means for intermittently supplying pressure fluid to the cylinder on the opposite side of said piston comprising a valve chamber in said cylinder head, a passageway, including said chamber, for establishing a pneumatic connection between said cylinder and a source of pressure fluid, poppet valve means in said chamber, including a stem responsive to movements of the piston for actuating said valve means, and springs associated with said valve means to cause the latter to operate with a snap action.

5. A fluid motor for operating lubricant pumping mechanism comprising a cylinder, a piston reciprocable therein, a piston rod providing a driving connection for the pumping mechanism, a continuously open pneumatic connection between one end of said cylinder and the source of pressure fluid, a head for said cylinder including a valve chamber, passageways connecting said chamber with said cylinder, the atmosphere, and said pneumatic connection, respectively and snap-acting poppet valve means in said chamber for controlling the passage of fluid through said passageways, and adapted alternately to connect the head end of said cylinder with the atmosphere and with said pneumatic connection.

6. In a fluid motor for operating a lubricant pumping mechanism, the combination of a cylinder with a piston having a central bore and reciprocable in said cylinder, means for connecting one end of said cylinder to a source of fluid under pressure, a piston rod secured to said piston and having a bore coaxial with said piston bore, a head on the other end of said cylinder, a valve chamber in said head, a valve stem reciprocably secured in said head and projecting through said cylinder into said bores, passageways connecting said chamber only with the head end of the cylinder, the atmosphere, and a source of pressure fluid respectively, poppet valve means in said chamber carried by said valve stem, and resilient means normally urging said valve stem and poppet valve means to a position to close the passageways from the source of pressure fluid to the cylinder, said piston rod being adapted to engage the end of the valve stem near the completion of the operative stroke of the piston to shift said poppet valve means to connect the head end of the cylinder with the source of pressure fluid for effecting the return of the piston.

7. A fluid motor for operating lubricant pumping mechanism comprising a cylinder, a piston reciprocable therein, a piston rod providing a power connection for the pumping mechanism, a pneumatic connection between one end of said cylinder and a source of pressure fluid, said connection being open at all times, a head for said cylinder including a valve chamber, poppet valve means therein controlling the passage of fluid to and from the head end only of said cylinder, a valve stem for operating said poppet valve means actuated by the piston during the completion of its operative stroke, and a spring interposed between said valve stem and said piston and arranged to cause snap action of said poppet valve means.

ERNEST W. DAVIS.